March 8, 1927.

E. E. WINKLEY 1,620,149

MACHINE FOR USE IN THE MANUFACTURE OF HEELS FOR BOOTS AND SHOES

Original Filed Feb. 19, 1920    7 Sheets-Sheet 1

March 8, 1927.

E. E. WINKLEY 1,620,149

MACHINE FOR USE IN THE MANUFACTURE OF HEELS FOR BOOTS AND SHOES

Original Filed Feb. 19, 1920   7 Sheets-Sheet 2

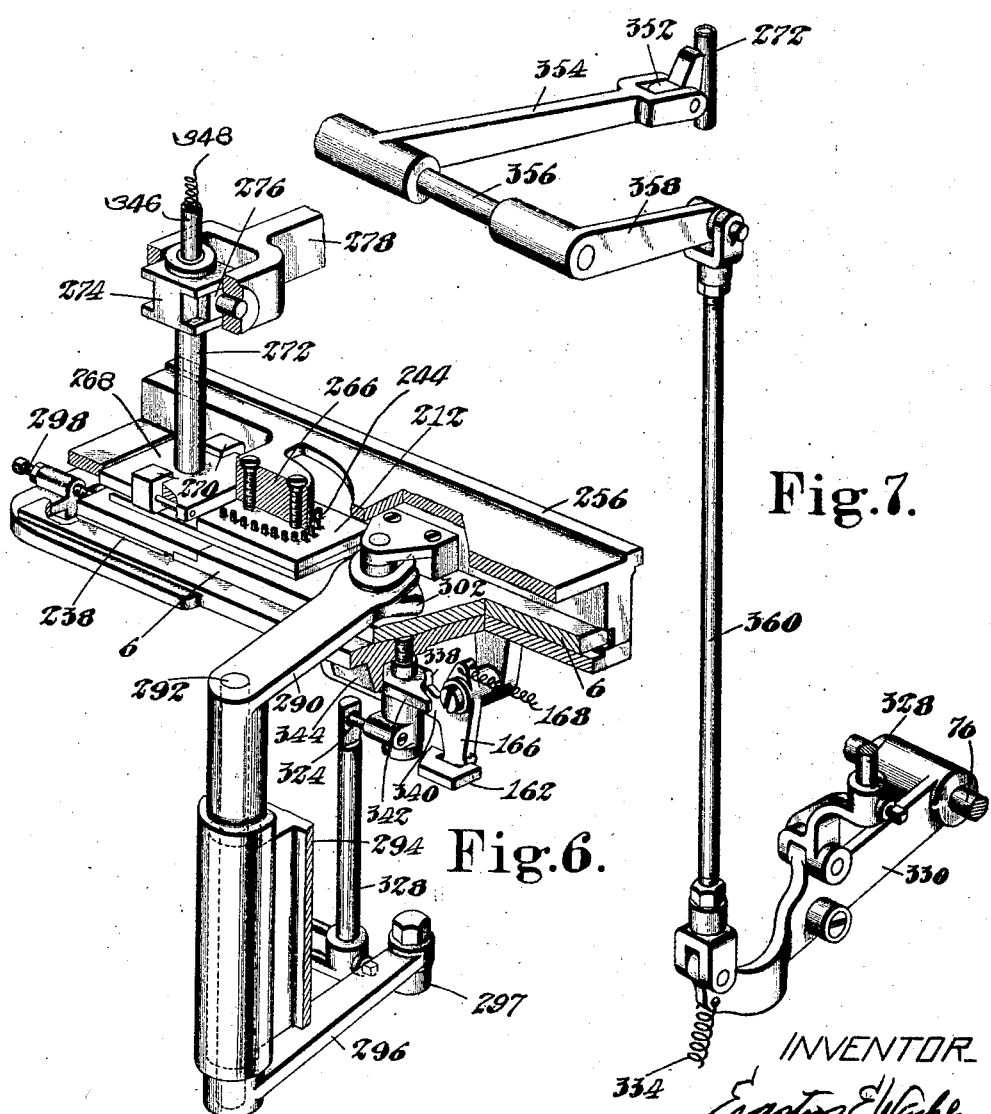

March 8, 1927.
E. E. WINKLEY
1,620,149
MACHINE FOR USE IN THE MANUFACTURE OF HEELS FOR BOOTS AND SHOES
Original Filed Feb. 19, 1920  7 Sheets-Sheet 6
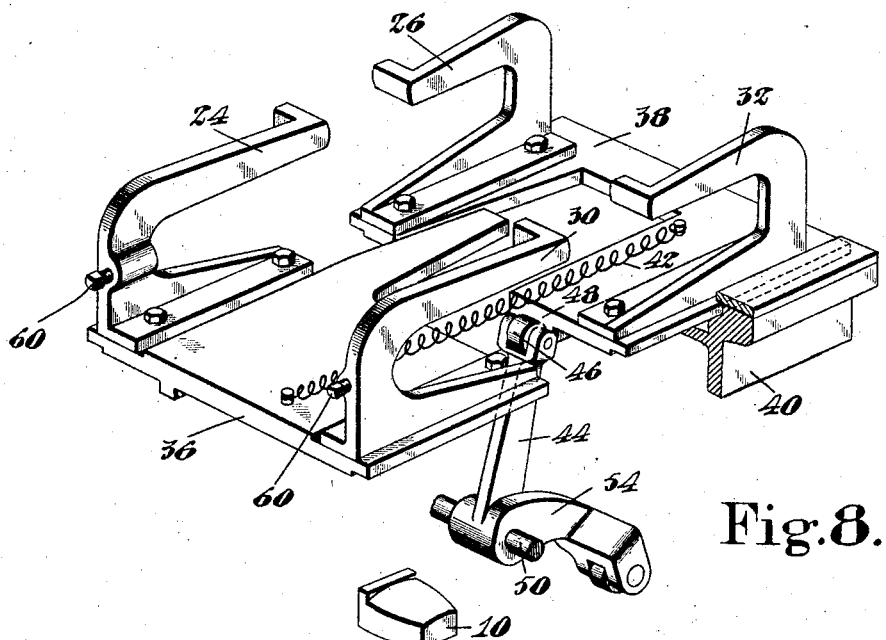
Fig. 8.
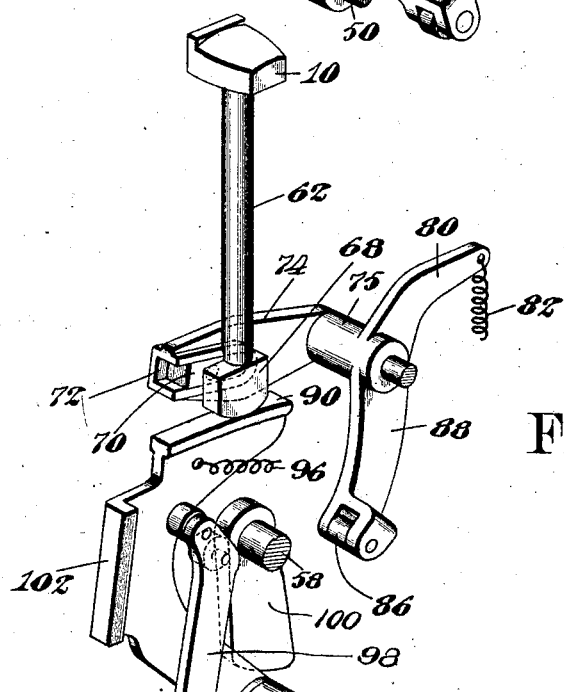
Fig. 9.
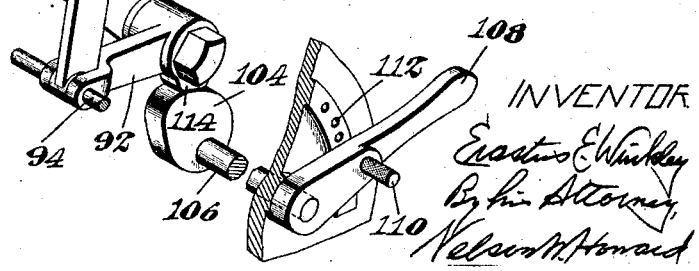

March 8, 1927. 1,620,149
E. E. WINKLEY
MACHINE FOR USE IN THE MANUFACTURE OF HEELS FOR BOOTS AND SHOES
Original Filed Feb. 19. 1920 7 Sheets-Sheet 7

INVENTOR
Erastus E. Winkley
By his Attorney
Nelson W. Howard

Patented Mar. 8, 1927.

1,620,149

UNITED STATES PATENT OFFICE.

ERASTUS E. WINKLEY, OF LYNN, MASSACHUSETTS, ASSIGNOR TO UNITED SHOE MACHINERY CORPORATION, OF PATERSON, NEW JERSEY, A CORPORATION OF NEW JERSEY.

MACHINE FOR USE IN THE MANUFACTURE OF HEELS FOR BOOTS AND SHOES.

Application filed February 19, 1920, Serial No. 359,798. Renewed June 21, 1924.

The present invention relates to machines employed in the manufacture of heels for boots and shoes, and the illustrated exemplification of the invention is particularly designed for slugging the heels.

The slugs which are inserted in heels are sometimes of a length to pass entirely through the top-lift of a heel so as to co-operate with the heel nails in securing the top-lift to the heel. On the other hand, however, it is a frequent practice to insert slugs which do not pass through the top-lift, and which, in consequence, serve only to ornament it and to enhance its wearing qualities. The word "fastening" will sometimes be used in the following specification and claims, and as used is intended to comprehend a slug of any dimensions, whether of a length to pass through the top-lift or not, and other objects analogous in construction or function to a slug.

An object of the invention is to produce a machine for slugging heels adapted to constitute one of a system of automatic machines for making heels, and, to this end a feature of the invention resides in the provision with means for slugging heels of means for automatically presenting heels to and delivering them from the slugging means. The heels may be supplied to the machine in any suitable manner. In the illustrated embodiment of the invention, however, it is contemplated that they will be brought to the machine by a conveyor upon which they have been placed as by a machine which performs a previous operation on them, for example, a heel-shaping machine of the type disclosed in Patent No. 1,102,310, granted to me July 7, 1914. After the heels have been slugged, they may, as shown, be returned to the conveyor for transport to other machines of the system.

A further feature of the invention pertains to means for operating on a heel in combination with novel mechanism for locating the heel with relation to the operating means and for controlling the heel during its movement toward and from the operating means.

Another important feature of the invention relates to the provision with fastening inserting means of improved means for presenting fastenings to the fastening inserting means, certain of the features of improvement of the presenting means being constituted of novel means for feeding the fastening stock and for measuring the fastenings. Some of the fastenings presented to the inserting means are preferably of a length to pass through a top-lift while others are too short to pass through it. Accordingly, the measuring means is so constructed as to cause fastening of different lengths to be presented to the inserting means. In the illustrated machine, the lengths of the fastenings are determined by a pattern member adapted to be changed to vary the numerical proportion and relative arrangement of long and short fastenings.

The illustrated machine is of the type by which the fastenings are to be inserted in a piece of work at a single operation. Accordingly, the machine comprises a plurality of devices for driving the fastenings, the arrangement of which it is desirable to vary when operating on work of varying dimensions. Manifestly, any modification of the arrangement of the driving devices necessitates a corresponding change in the means for presenting fastenings to those devices. A still further feature of the invention contemplates the provision of fastening driving devices and means for presenting fastenings to the driving devices so constructed as to facilitate their accommodation to operation on work of varying dimensions. To this end, in the disclosed embodiment of the invention, the driving devices and the presenting means are caried by a holder detachably mounted on the frame of the machine. When the holder is withdrawn from the machine, the driving devices and the parts of the presenting means which co-operate directly either with the fastening stock or with the driving devices can readily be removed, and coresponding parts of a character suited to the dimensions of the work can be substituted therefor.

The illustrated exemplification of the invention is designed particularly for operation on a heel before it is attached to a boot or shoe. It is recognized, however, that the invention in certain of its aspects and features may be utilized for slugging heels after they have been incorporated in boots and shoes. Moreover, the invention and certain features thereof may be employed in the performance of operations on boots and shoes other than slugging their heels. Accordingly, it is intended that the scope of the invention shall not be restricted except as required by the claims.

Other objects and features of the invention will appear as the description proceeds and will be pointed out in the claims.

In the drawings,

Fig. 6 is a view of the detachable slide which carries the slugging mechanism, showing the connections between the elements of the slugging mechanism and their operating means;

Fig. 7 illustrates the means for lifting the spring pressed plunger which engages the top lift of the heel;

Fig. 8 shows the sweeps which move the heels off and on the conveyor;

Fig. 9 is a view of the means for operating the heel plate and for locking it in raised position;

Figs. 11 to 14 exhibit diagrammatically the manner in which the heels are transferred from the conveyor to the slugging mechanism and back to the conveyor.

Figure 4:
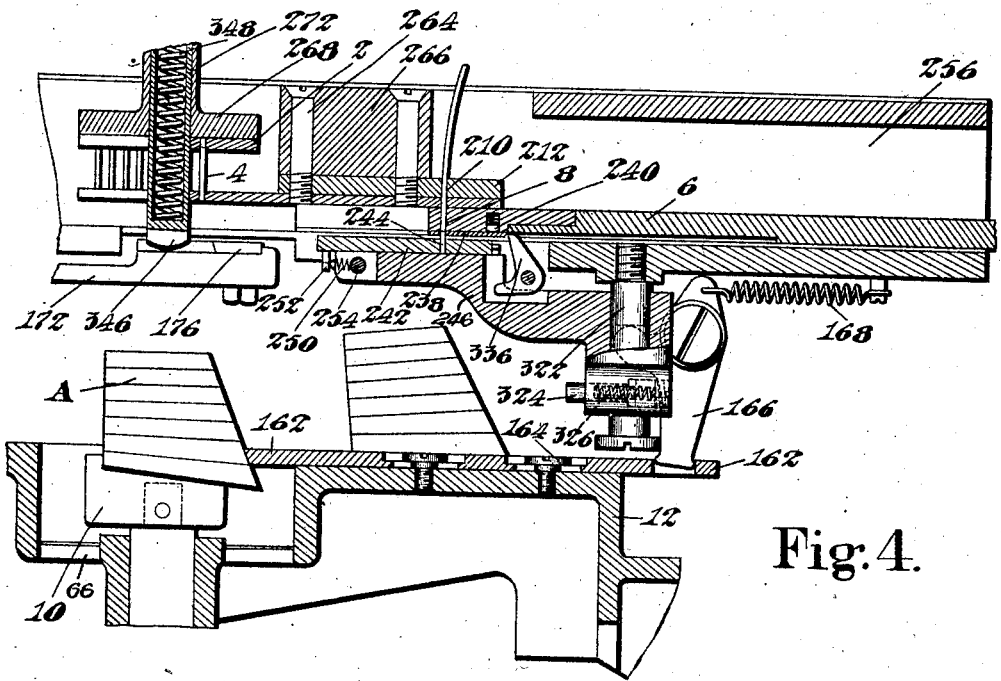
Fig. 4 is a view in cross-sectional elevation through the slugging devices and the means for presenting the slugs thereto.
Figure 5:
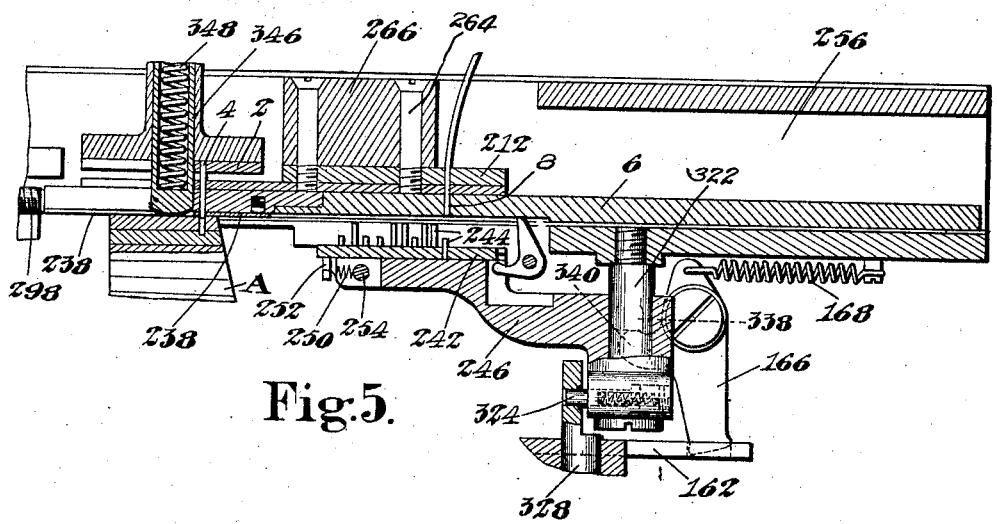
Fig. 5 is a view similar to Fig. 4 but showing the parts in the positions which they occupy at a different point in the cycle of operations of the machine.
Figures 11, 12, 13:
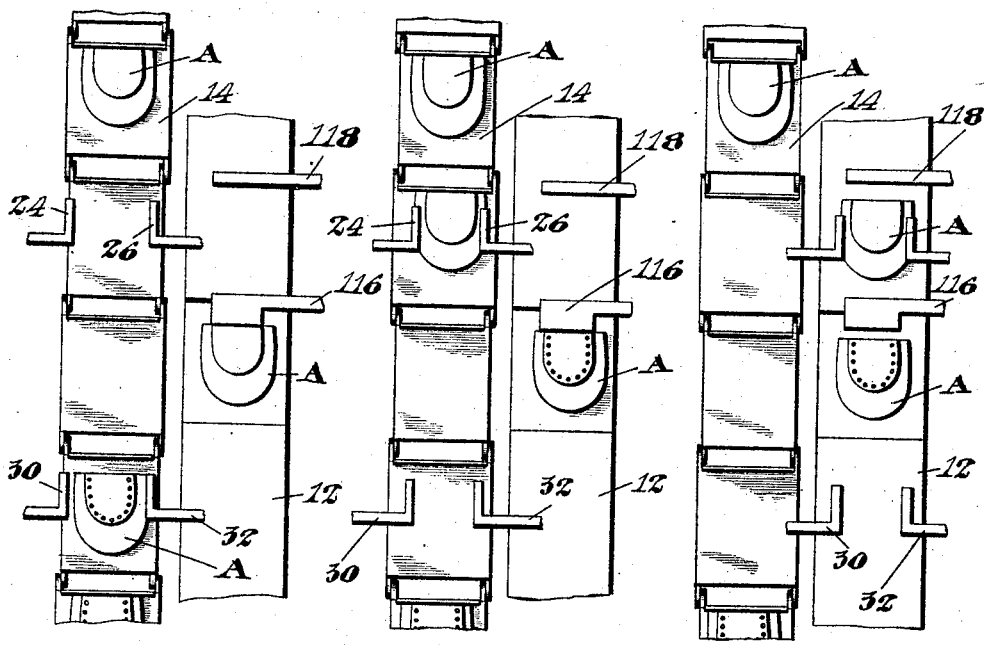

In the illustrated exemplification of the invention, the means for operating on the heels comprises slugging devices consisting of a plate 2 (see Figs. 4 and 5) upon which are mounted drivers 4, the slugs being presented to the drivers 4 by mechanism including a carrier plate 6 having openings 8 to receive the slugs. The openings 8 of the carrier plate 6 are adapted to be alined with the drivers 4 as seen in Fig. 5. In the operation of the machine, a heel A is raised against the lower surface of the plate 6 and supported in such position against the impact of the drivers 4 by a heel plate 10.

Figure 3:
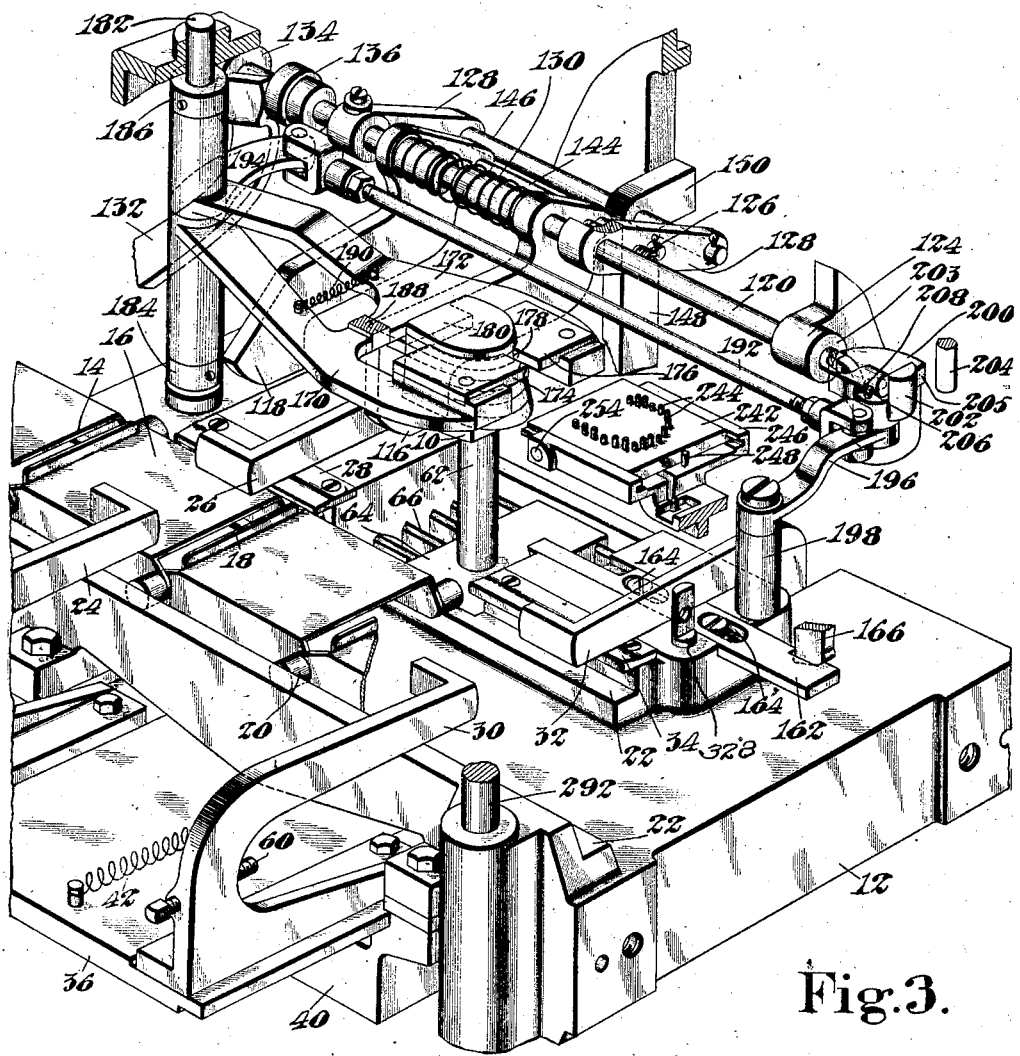
Fig. 3 is a view in perspective of the means for automatically presenting heels to and delivering them from the slugging mechanism.

As already pointed out, it is contemplated that the illustrated machine will form one of a system of automatic heel making machines which will be interconnected by conveyors operating to transport the heels to and from the machines. To this end the table 12 constituting a part of the frame of the machine (see Fig. 3) is constructed to provide a guideway for a conveyor 14 adapted to bring a heel to the machine from a preceding machine of the system and to carry the heel away from the machine to a succeeding machine. As shown, the conveyor 14 comprises links 16 having upstanding flanges 18 at their rear ends serving to gage the heels on the conveyor by engagement with their breasts and being provided with laterally extending lugs 20 adapted to ride on trackways 22 formed on the table 12. The mechanism for transferring the heels A from the conveyor 14 to the slugging mechanism and from the slugging mechanism back to the conveyor comprises two pairs of sweeps, one pair acting to move the heels off of and the other to move the heels on to the conveyor. As seen in Fig. 3, the conveyor 14 travels toward the right, and the heels are moved from the conveyor by a pair of sweep arms 24 and 26 which deposit them on the table 12. To facilitate this operation, the table 12 is recessed adjacent to the conveyor, and a plate 28 having its upper surface inclined downwardly toward the conveyor is seated in the recess. The heels are restored to the conveyor 14 by sweep arms 30 and 32, the operation of which is supplemented by a plate 34 also recessed into the top of the table 12 but having its top surface inclined upwardly toward the conveyor to raise the heels during their movement onto the conveyor.

Figure 1:
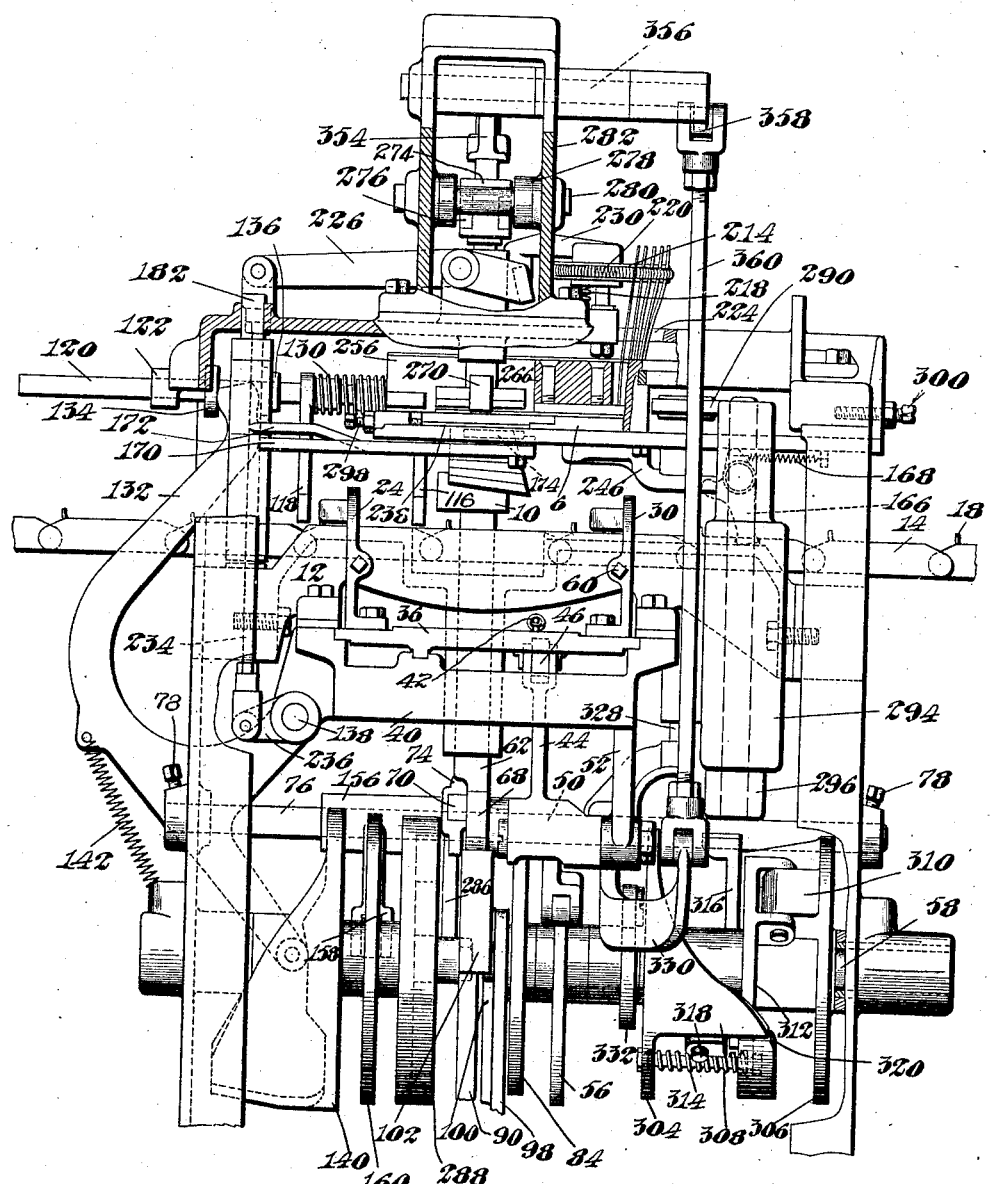
Fig. 1 is a view in front elevation of a machine according to the invention.
Figure 2:
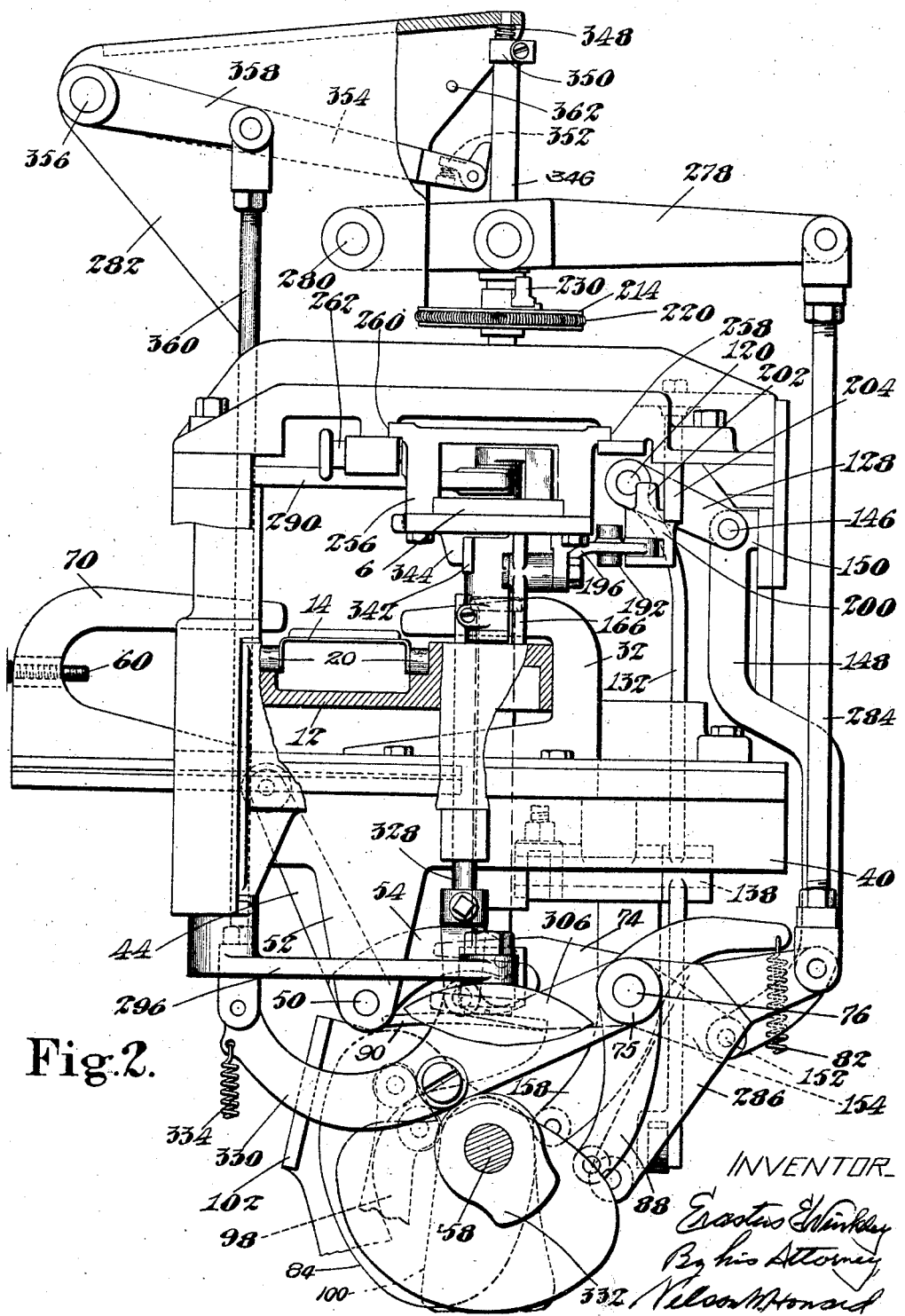
Fig. 2 is a view in elevation taken from the right in Fig. 1 and partly in cross section.

Referring now to Fig. 8, it will be seen that corresponding arms 24 and 30 of the pairs of sweeps are mounted on a plate 36 for movement as a unit, and that the arms 26 and 32 are similarly mounted on a plate 38. The plates 36 and 38 are supported for translatory movement substantially at right angles to the conveyor 14 in guideways provided by a member 40 rigidly secured to the table 12 (see Figs. 1 and 3). In order to cause the members of each pair of sweeps normally to move together, the plates 36 and 38 are joined by a coiled spring 42. It is desirable, however that the members of the pairs of sweeps shall be separated at the ends of their movement to facilitate the introduction of the heels between them and the ejection of the heels therefrom. To this end, I provide operating means for the sweeps arranged to be operatively connected selectively with the plates 36 and 38 and further provide means for limiting the common movement of the plates 36 and 38 in both directions of their movement to an extent less than the range of movement of the operating means. As shown, the means for operating the sweeps comprises an arm 44 carrying a roll 46 for engagement with opposed surfaces 48 presented by the plates 36 and 38. The arm 44 forms part of a bell crank lever which is fulcrumed on a shaft 50 supported in an ear 52 (see Figs. 1 and 2), depending from the member 40. The other arm 54 of the bell crank lever carries a roll disposed for engagement with a cam 56 on the main cam shaft 58 of the machine. A spring (not shown) acts to hold the cam roll of the arm 54 against the cam 56. The movement of the plate 38 is limited by engagement of the bowed portions of the sweep arms 26 and 32 with the edge of the table 12 (see Figs. 1 and 3), whereas the limit of movement of the plate 36 and the sweep arms 24 and 30 carried thereby is adjustably determined by stop screws 60 threaded into the arms 24 and 30 in position to engage the opposite edge of the table 12. The disposition of a heel on the heel plate 10 in a direction parallel to the breast of the heel is dependent upon the extent to which the sweep arm 24 is moved in delivering the heel to the table 12. Consequently, the adjustable stop screws 60 enable heels of varying dimensions to be properly positioned on the heel plate. By the yieldable connection between the plates 36 and 38 and the arrangement of the stops, the arms of the pairs are separated in their movement to facilitate the reception and release of the heels and then drawn together to grip said heels.

The table 12 is formed with an opening to receive the heel plate 10 which is carried by a post 62 slidable vertically in a member 64 which bridges said opening. Gratings 66 are interposed between the member 64 and the adjacent portions of the table 12. The heel plate 10 is lowered below the top of the table 12 to enable a heel to be conveniently placed upon it from the table and is then raised to lift the heel to the slugging mechanism. To this end, the post 62 is formed at its lower end with a rounded boss 68 having a pin extending laterally therefrom on which is loosely mounted a block 70 (Fig. 9) arranged to slide in a recess 72 in an arm 74 constituting part of a three-armed lever 75. The lever 75 is carried by a cam lever shaft 76, which extends transversely of the machine frame parallel to the cam shaft 58 (see Fig. 1) and is constrained against rotation by set screws 78. The arm 80 of the lever 75 is acted upon by a coil spring 82 in a direction to lift a heel on the heel plate 10 yieldingly against the carrier plate 6, and the heel plate is lowered against the resistance of the spring 82 by a cam 84 on the shaft 58 acting on a roll 86 carried by the third arm 88 of the lever 75.

The spring 82 constitutes a convenient means for lifting the heel plate, inasmuch as it automatically compensates for variations in the height of the heels. It is very desirable, however, that the heels be maintained against the carrier plate 6 with sufficient power to prevent them from being thrust away from it by the impact of the drivers 4. Since the drivers 4 act with considerable force on the heels, it is not practicable to make the spring 82 strong enough to afford the rigidity of support necessary during the slugging operation. Accordingly, means is provided for locking the heel plate 10 in raised position. Such means may have various embodiments, but, as shown, it comprises a wedge member or abutment 90 pivoted on a stud shaft carried by an arm 92 in turn fulcrumed on a shaft 94 mounted on the machine frame. The wedge 90 has its upper surface inclined downwardly toward the right (see Fig. 9) and disposed for engagement with the boss 68 on the post 62. A spring 96 tends to move the wedge to the right and thus to cause it to follow the post 62 in its upward movement, or in the direction of the axis of the heel carried by the plate 10. Consequently, the wedge 90 will lock the heel plate in the highest position to which it is raised by the spring 82. To the end that the heel plate 10 may be lowered after the slugging operation has been completed, the wedge is moved out from beneath the boss 68 on the post 62. As illustrated, this is effected by an arm 98 fulcrumed on the shaft 94 and having rolls for engagement respectively with a cam 100 on the cam shaft 58 and a laterally extending flange 102 on the wedge 90. In order to adapt the machine for operation on heels which vary considerably in height, means is provided for adjusting the wedge member 90 vertically about the shaft 94. A convenient embodiment of such means comprises an eccentric 104 carried by a shaft 106 journaled in the frame of the machine and provided with a handle 108 having a spring pressed pin 110 adapted for engagement with any one of a series of openings 112 formed in the machine frame. The eccentric 104 acts on an enlarged portion 114 of the hub of the link 92. The arrangement of the boss 68 on the post 62 of the heel plate and the wedge 90 adapts the machine for operation on heels of varying height within limits determined by the extent of inclination of the surface of the wedge. If heels are being operated upon of a greater variation in height than that provided for by the inclined surface of the wedge 90, the wedge will be adjusted bodily by manipulation of the handle 108.

When the heel plate 10 is in lowered position, a slugged heel is moved off of the heel plate on to the table 12 between the sweep arms 30 and 32, and a fresh heel is synchronously moved on to the heel plate from between the sweep arms 24 and 26 by pushers 116 and 118, respectively. The pushers 116 and 118 are mounted loosely on a rod 120 slidable in bearings 122 (see Fig. 1) and 124 (see Fig. 3) on the machine frame. As shown, the pushers are adjustably positioned on the rod 120 by stop screws 126 carried by arms 128 fixed to the rod. A spring 130 interposed between the pushers 116 and 118 and, preferably, embracing the hubs of the pushers, as shown, normally maintains them against their respective stop screws. The spring 130 also acts yieldingly to actuate the pusher 116 when the rod 120 is moved to the right, as seen in Fig. 3. In the illustrated exemplification of the invention, the rod 120 is reciprocated endwise in its bearings 122 and 124 by a lever 132 (see Fig. 1) having its end received between collars 134 and 136 on the rod. The lever 132 is secured to a shaft 138 journaled in the member 40 and is provided with a cam roll riding on the track of a cam 140 on the cam shaft 58. A spring 142 constrains the lever 132 to move under the control of the cam 140.

Inasmuch as a fresh heel is slid on to the heel plate 10 by the pusher 118 when a slugged heel is moved off the plate by the pusher 116, it is necessary to shift the pusher 116 transversely of the direction of reciprocation in order to cause it to clear the heel on the plate 10 in its return movement. In the operation of the illustrated machine, the pushers 116 and 118 are rocked down out of the path of movement of the heels before they start their return. To effect this, means is provided for imparting angular movement to the rod 120, and the pushers 116 and 118 are so connected to the rod 120 as to partake of such movement. As shown, the pushers are extended rearwardly of their hub portions, and a rod 144 is passed loosely through such extensions and supported in the arms 128. It will readily be understood that this construction does not interfere in any way with the freedom of sliding movement of the pushers on the rod 120. In order to operate the rod 120 angularly, the arms 128 are joined by a shaft 146 upon which is loosely mounted a link 148 having its upper end, adjacent to its point of connection of the shaft 146, deflected laterally at 150 for engagement with a guideway formed in the frame of the machine. The link 148 is connected at 152 with an arm 154 pivoted loosely on the cam lever shaft 76. The hub 156 (see Fig. 1) of the arm 154 is provided with an arm 158 carrying a cam roll for engagement with the periphery of a cam 160 on the cam shaft 58.

The pusher 118 functions as a gage to locate the heels on the heel plate 10 with their breasts in a predetermined relation to the plane of the drivers which insert the slugs at the breast corners of the heels, and its stop screw 126 provides means for regulating the relation of the breast of the heel to the slugging devices, as desired. In order that the heel may be fully controlled by the pusher 118, means is provided on the delivery side of the heel plate for maintaining the heels against the pusher 118 during their movement on to the heel plate. As shown, such means comprises a bar 162 slidably supported in a channel in the top of the table 12. Heels are frequently formed with their backs inclined from their heel seat faces, to their tread faces, as shown in Fig. 4. In such event, the bar 162 will preferably have its end beveled to correspond substantially with the configuration of the backs of the heels. The bar 162 is retained in place by screws 164 passing through elongated slots formed in the bar. A lever 166 has its end entering an opening in the bar 162 and is actuated by a spring 168 in a direction to cause the beveled end of the bar to engage a heel on the heel plate 10 and to press the heel against the pusher 118 during the latter part of its movement on to the heel plate.

As hereinbefore indicated, the position of a heel with relation to the heel plate 10 and the slugging devices, in a direction parallel to the breast of the heel, is preliminarily determined by the extent of the movement of the sweep arm 24 under the control of the screws 60, and in a direction at right angles thereto by the pusher 118. The sweep arm 24 and pusher 118 serve to locate the heels with sufficient accuracy for some purposes. However, in the present instance, in order to insure that the heels be very accurately located with reference to the slugging devices, further means is provided for engaging the heels during their approach to the carrier plates 6 and centering them relatively to the slugging devices. In the illustrated construction, such means comprises a pair of jaws 170 and 172, and to the end that the jaws 170 and 172 may be readily adapted for heels of varying sizes, they are provided with detachable gripper plates 174 and 176 for engagement with the heels. The plates 174 and 176 are disposed adjacent to the carrier plate 6 so as to cause them to engage the heels at a small distance from their tread faces when the heels are in contact with the carrier plate, as clearly appears from Fig. 3. The plates 174 and 176 are beveled downwardly and outwardly as shown at 178 to facilitate the introduction of the heels between them. The pusher 116 is formed with a flange 180 for engagement with the breasts of the heels to move said heels firmly into engagement with the gripper plates 174 and 176. When the heel plate 10 is lowered subsequently to the slugging of a heel, the heel is moved below the level of the flange 180 and is engaged by the flat side of the pusher 116 during its removal from the heel plate 10.

The jaws 170 and 172 have their hubs loosely sleeved on a stud shaft 182 between collars 184 and 186. The stud shaft 182 is slidably fitted in bearings on the machine frame, and the upper collar 186 is normally spaced somewhat from the opposite face of the corresponding bearing (see Fig. 3). With this construction, the gripper plates 174 and 176 are enabled firmly to engage and center the heel before it is brought into contact with the carrier plate 6, inasmuch as the grippers may partake of any further upward movement of the heel occurring after it has been gripped by them.

The gripper jaws 170 and 172 are controlled in their angular positions with reference to the stud shaft 182 by a stop 188, which will be hereinafter again referred to, arranged for engagement with oppositely disposed inwardly extending projections on the jaws 170 and 172. A spring 190 urges the jaws toward each other against the stop 188. In the operation of the illustrated construction, the jaw 172 is continuously maintained against the stop 188. Preferably, however, the jaw 170 is intermittently moved away from the stop to open the jaws, thus permitting the heels to be readily presented to them. As shown, the opening of the jaws is effected by a link rod 192 connected to an arm 194 extending from the hub of the jaw 170. The link 192 is actuated by an arm 196 fulcrumed on a post 198 rising from the table 12. Pivotally mounted on the free end of the arm 196 is a locking member 200 having a part 202 upstanding therefrom and normally collinear with the rod 120. The bearing 124 is notched in the lower half of its outer portion (see Fig. 3), the inner surface of the notch extending in the same general direction as the rod 120. The locking member 200 is received in said notch. With this construction, when the rod 120 is moved endwise toward the right as seen in Fig. 3, it strikes against the projection 202 on the locking member 200 and moves the locking member and the arm 196 with it, thus opening the centering jaws 170 and 172.

During such movement of the locking member 200, its edge rides on the inner surface of the notch in the bearing 124. Continued movement of the arm 196, however, carries the locking member 200 clear of the notch, whereupon it is swung about its point of connection to the arm 196 into engagement with the transverse surface 203 of the bearing 124 remote from the pushers 116 and 118, the bearing 124 then acting as an abutment to maintain the jaw 170 in open position. The spring 190 acting through the link 192 and arm 196 holds the locking member 200 against the bearing 124. Manifestly, the locking member 200 and its projection 202 may be so disposed with relation to the arm 196 and the rod 120 as to cause the rod 120 to swing the member 200 into locking engagement with the transverse surface 203 of the bearing 124. In the illustrated construction, however, in order positively to insure that the member 200 will be locked on the bearing 124, a pin 204 depends from the frame of the machine in position to contact with the edge 205 of the member. The member 200 is released from locking engagement with the bearing 124 by a pin 206 on the rod 120 acting against a shoulder 208 on the locking member. When the pushers 116 and 118 are in their heel engaging positions, the pin 206 is so disposed as to permit the rod 120 to be reciprocated without effecting engagement of the pin with the shoulder 208 of the locking member. When, however, the rod 120 is rocked so as to swing the pushers 116 and 118 out of the path of the heels in passing on and off the heel plate 10, the pin 206 is turned downwardly with the result that when the rod 120 is moved to the left, as seen in Fig 3, to effect the returning movement of the pushers 116 and 118, the pin 206 strikes against the shoulder 208 of the member 200 and swings it back out of locking engagement with the bearing 124, thereby allowing the spring 190 to close the gripper jaws.

The carrier plate 6 is operated to aline its openings 8 alternately with the drivers 4 and openings 210 in a plate 212 functioning to guide the fastening stock. The illustrated exemplification of the invention is designed to insert slugs formed from wires, which are fed into the openings 210 in the wire guiding plate 212 by means now to be described. A disk 214 (see Figs. 1, 2 and 10) is slidably mounted on a post 216 upstanding from the machine frame and is normally maintained in raised position on the post by a compression spring 218 between the disk 214 and the machine frame. The periphery of the disk 214 is provided with transverse slots 220 to receive the wires which are pressed frictionally against the disk by an endless coiled spring 222 fitting into a groove formed in the peripheral face of the disk. The wires pass through a slot 224 in the top of the machine frame. The disk 214 is moved downwardly by a lever 226 pivoted at 228 on the machine frame, to thrust the ends of the wires into the openings 8 of the carrier plate 6, which at that time in the cycle of operations of the machine are alined with the openings 210 of the wire guiding plate 212. Conveniently, and as shown, the lever 226 has pivoted thereto adjacent to the disk 214 an arm 230 having its end received in a channel provided in a member 232 superposed on the disk 214. If it is desired to substitute a disk of different character or dimensions for the disk 214, it is only necessary to depress the disk slightly against the resistance of the spring 218 thus freeing the arm 230 from the channel of the member 232, after which the arm 230 may be turned to one side, the disk removed, a new one placed on the post 216, and the arm 230 engaged with the new disk as before. The lever 226 is operated by a link 234 joined to an arm 236 (see Fig. 1) in turn carried by the shaft 138 to which rocking movement is imparted by the lever 132.

A shutter plate 238 having openings arranged in accordance with the slugging design is slidably supported beneath the main body of the carrier plate 6, by means of dovetails or the like, for movement therewith and also relatively thereto, and a spring-actuated plug 240 seated in the carrier plate 6 tends frictionally to retain the shutter plate 238 in any position to which it may be moved with reference to the carrier plate. As clearly appears from Fig. 4, when the openings 8 of the carrier plate 6 are in position to receive the ends of the wires from the openings 210 of the wire guiding plate 212, the openings of the shutter plate are also alined with the openings 8 and 210. Preferably, means is provided for measuring the lengths of the slugs formed from the wires. As shown, such means comprises a pattern member in the form of a plate 242 provided with pins 244 detachably seated in openings in the plate 242 and adapted for projection into the openings of the shutter plate 238 and carrier plate 6 when they are in wire feeding position. The pins 244 function as stops to limit the extent to which the wires enter the openings 8 of the carrier plate 6 and thereby determine the lengths of the slugs which will be severed from the wires on subsequent movement of the carrier plate relatively to the wire guiding plate 212. As hereinbefore indicated, it is sometimes desirable that the slugs co-operate with the heel nails in securing a top-lift to a heel. In such cases, however, it is usually not necessary that all of the slugs should pass through the top-lift into the body of the heel. Consequently, to make all the slugs of a length to pass through the top-lift would involve a waste of the stock from which the slugs are made. The present invention enables the lengths of the slugs to be varied as desired, inasmuch as the stop pins 244 may be of any desired length, and the arrangement and numerical proportion of the relatively long and short pins may be readily changed. The longer a stop pin 244 is, the shorter will be the slug introduced into the corresponding opening of the carrier plate 6. The stop pin plate 242 is dovetailed into a bracket 246 which is provided with a pin 248 (see Fig. 3) against which the plate 242 is normally held by a spring 250 (Figs. 4 and 5) connected at its ends to a pin 252 depending from the plate 242 and to a rod 254 seated in the bracket 246.

In order to adapt machines of the type to which this invention relates to operate on heels of different sizes, it is necessary to vary the arrangement of the openings in the carrier plate and the drivers. This can be most readily accomplished by providing a plurality of interchangeable carrier plates and driving devices constructed to present fastening receiving openings and drivers of various arrangements. In accordance with an important feature of the invention, the substitution of such parts is facilitated by providing the carrier plate 6 and drivers 4 on a holder slide 256 detachably mounted in guideways 258 and 260 on the machine frame (see Fig. 2). The stop 188 for the jaws 170 and 172 projects from this slide 256. A spring pressed pin 262 having its inner end fitting into a socket in the slide 256 may be utilized to secure the slide in place. Inasmuch as the arrangement of the openings 210 in the wire guiding plate 212 and the stop pins 244 on the stop pin plate 242 must correspond with that of the openings 8 in the carrier plate, the plate 212 and the bracket 246 which supports the stop pin plate 242 are also carried by the slide 256 to enable the ready substitution of such parts. As shown, the plate 212 is formed in two sections, the lower of which is extended forwardly and provided with openings to receive the drivers 4. Screws 264 secure the plate 212 to a cross piece 266 on the slide 256. The carrier plate 6 also may be, and as shown is, formed in two sections. In such a case, only that part containing the openings 8 would need to be changed.

The plate 2 carrying the drivers 4 is operated by a head 268 mounted to reciprocate in the top of the machine frame. When the slide 256 is withdrawn from the machine, the slug driving devices comprising the plate 2 and drivers 4 are carried with it by reason of the projection of the drivers into the openings of the plate 212. In order to permit the driving devices to be withdrawn and automatically to connect the plate 2 with the head 268 when the slide is again applied to the machine, the head has pivoted thereon pawls 270 the upper ends of which are pressed outwardly by springs (not shown) seated in the head. The lower ends of the pawls 270 are beveled so as to cause them to be forced outwardly in opposition to the springs by engagement with the edges of the plate 2. When the head 268 is moved into contact with the plate 2, the pawls 270 engage under the plate and hold it securely against the head. The head 268 is carried by a spindle 272 having a cross head 274 provided with grooves in which blocks 276 are slidably received. The blocks 276 are pivoted in the forked end of a lever 278 fulcrumed at 280 in a housing 282 on the top of the machine frame. The other end of the lever 278 is joined to a link rod 284 pivoted to a lever 286 on the cam lever shaft 76. The lever 286 is operated by a cam 288 (see Fig. 1) on the cam shaft 58.

In the present instance of the invention, the operating means for the carrier plate 6 comprises an arm 290 (Fig. 6) forked to fit over a stud fixed on the plate. The shaft 292 on which the arm 290 is secured is journaled in a bracket 294 on the frame of the machine and has an arm 296 on its lower end provided with a cam roll 297 disposed for engagement with a cam on the cam shaft 58. The carrier plate 6 must be positioned with great accuracy at each end of its movement in order to insure exact alinement of its openings 8 with the openings 210 of the wire guiding plate 212 and the drivers 4 respectively. As shown, such alinement is accomplished by a stop screw 298 disposed for engagement with the forward end of the carrier plate 6 and a second stop screw 300 (see Fig. 1) arranged to engage an offset portion 302 on the arm 290 on backward movement of the arm. In order to permit the carrier plate 6 to be controlled by the stop screws 298 and 300, it is, preferably, moved yieldingly through the latter part of its movement in both directions. It is desirable, however, that the carrier plate 6 be operated positively throughout the remainder of its cycle of movement, particularly when it is moved to sever the wires against the wire guiding plate 212. Accordingly, the cam for operating the arm 290 is peculiarly devised to effect such results. As shown, it comprises two cam disks 304 and 306 mounted in spaced relation on the cam shaft 58 and each comprising a rise 308 (see Fig. 1) terminating in an abrupt shoulder. Fulcrumed to a lug 310 on the disk 306 is a wing 312 constructed and arranged to present a cam surface normally maintained in substantial alinement with the rise on the disk 304 by a spring 314. A similar wing 316 pivoted at 318 on the disk 304 is normally maintained in alinement with the rise on the cam disk 306 by means analogous to the spring 314. The cam surfaces of the wings 312 and 316 are inclined as indicated at 320 to constitute continuations of the rises 308 on the cam disks 304 and 306. With this arrangement, as the carrier plate 6 approaches its limit of movement in one direction, the cam roll 297 on the arm 296 rides on to the wing 312, whereas, when the carrier plate approaches the limit of its movement in the opposite direction, the cam roll 297 rides on the wing 316. The springs 314 are of sufficient strength to cause the wings 312 and 316 to effect the completion of the movement of the carrier plate without yielding. When, however, the carrier plate abuts against the set screw 298 or 300, the corresponding wing will be moved back against the resistance of its spring. In the continued rotation of the cam shaft 58, the cam roll 297 passes off the end of the wing after which it is engaged by the rise 308 of the cam disk 304 or 306 to move the carrier plate 6 positively in the opposite direction.

The bracket 246 which supports the stop pin plate 242 is slidably mounted on a stud shaft 322 threaded into the floor of the slide 256. The hub of the bracket 246 is formed with a shouldered opening to receive a headed pin 324 (Fig. 5) normally pressed outwardly to the limit determined by its head by a spring 326 the other end of which abuts against a plug threaded into the opening. The pin 324 provides a detachable connection between the stop pin plate 242 and a rod 328 mounted for vertical reciprocation in the machine frame and having an opening at its upper end to receive the pin 324. The rod 328 is cut away at its upper end to provide a plane surface against which the pin 324 rides if the opening of the rod 328 is not in a position to receive the pin 324 when the slide 256 and the parts carried thereby are applied to the machine. In such a case, however, the pin 324 enters the opening of the rod 328 when such opening is presented to the pin in the subsequent reciprocations of the rod. The rod 328 is operated by a lever 330 (Figs. 1 and 7) pivoted on the cam lever shaft 76 and having a cam roll riding on a cam 332 on the cam shaft 58. A spring 334 constrains the lever 330 to move under the control of the cam 332.

As already indicated, the shutter plate 238 when the openings 8 of the carrier plate 6 are alined with the openings 210 of the wire guiding plate 212 has its openings in register with the openings 8 and 210. Means is provided, however, for moving the shutter plate 238 with relation to the carrier plate 6 previous to the severance of the slugs from the wires in order to close the openings of the carrier plate 6 and thus preclude the escape of the slugs therefrom. As shown, such means comprises a finger 336 fulcrumed on the slide 256 and having its upper end received in a channel in the bottom of the carrier plate 6 in a position to engage the rear edge of the shutter plate 238. The finger 336 has a portion projecting toward the left as seen in Fig. 5 into the path of movement of the stop pin plate 242. Consequently, when the stop pin plate 242 is lowered to withdraw the pins 244 from the openings 8 of the carrier plate 6 and from the openings of the shutter plate 238, it engages the projection on the finger 336 thereby forcing the upper end of the finger against the shutter plate and thus moving the openings of the shutter plate out of alinement with those of the carrier plate. During the subsequent movement of the carrier plate 6 to present the slugs contained in its openings 8 to the drivers 4, the openings of the shutter plate 238 are maintained out of alinement with those of the carrier plate by the action of the plug 240 on the shutter plate. As the carrier plate 6 and shutter plate 238 approach their driving positions, however, the end of the shutter plate is brought against the set screw 298 in consequence of which the shutter plate is maintained stationary so that the continued movement of the carrier plate 6 brings its openings again into register with the openings of the shutter plate.

When the heel being operated upon has its rear portion inclined from its heel seat face to its tread face, the bar 162 will overhang it, as appears at the left of Fig. 4. In this position, the bar 162 would interfere with the elevation of the heel to the slugging mechanism. To avoid such interference the bar 162 is moved away from the heel before the heel plate 10 begins its upward movement. A convenient means for effecting such movement of the bar 162 comprises a shoulder 338 (Fig. 6) on the hub of the bracket 246 and cooperating with a boss 340 on the arm 166. The bracket 246 supporting the stop pin plate is precluded from angular movement on the stud shaft 322 by the engagement of a lug 342 on the hub of the bracket with a rib 344 depending from the floor of the slide 256 (see Figs. 2 and 6).

There is sometimes a tendency on the part of a heel to adhere to the carrier plate 6 or the gripper jaws 170 and 172 after it has been slugged. Specifically, the tread face of the heel engages the shutter plate 238, but this plate may be considered a part of the carrier plate 6 so far as the presentation of the heels to the slugging mechanism is concerned. To insure that the heels will move with the heel plate 10 when it begins its downward movement, a plunger 346 is sleeved into the shank 272 of the head 268 and has its lower end extending below the driver plate 2 into the space defined by the drivers 4. The plunger 346 is pressed downwardly upon the tread face of a heel upon the plate 10 by a spring 348 interposed between the bottom of a hole formed in the plunger and the top of the housing 282. The downward movement of the plunger 346 with a heel is limited by the engagement of a collar 350 on the plunger (see Fig. 2) with a latch 352 carried by an arm 354 (see Fig. 7) which is mounted on a shaft 356 journaled in the housing 282. Secured to the shaft 356 is a second arm 358 to which is joined a link 360 connected to the end of the lever 330. With this construction, the arm 354 completes its upward movement subsequently to the discharge of the slugged heel from the heel plate 10 and simultaneously with the completion of the upward movement of the stop pin plate 242 and the inward movement of the bar 162 to press the heel next to be slugged against the pusher 118. After the pusher 118 has moved the heel into place on the heel plate 10 and while the bar 162 continues to press the heel against the pusher 118, the horizontal portion of the latch 352 on the arm 354 engages a pin 362 in the housing 282, and is thereby moved out of engagement with the collar 350 on the plunger 346 whereupon the spring 348 thrusts the plunger 346 downwardly upon the heel. The plunger 346 prevents the heel from being accidentally dislocated on the heel plate 10 during its elevation to the slugging mechanism and into the field of action of the gripper jaws 170 and 172. The plunger 346 also serves to center the driver plate 2 with reference to the head 268 when the slide 256 and the parts carried thereby are applied to the machine.

The manner of operation of the machine will now be described. Assuming that the parts are in the positions indicated in Figs. 1, 2, 3, 5, 6, 9 and 11, the heel plate 10 is locked in its uppermost position by the wedge 90 and holds a heel A clamped against the carrier plate 6, the pusher 116 being pressed yieldingly against the breast edge of the heel by the spring 130 to maintain the heel firmly in the grip of the centering jaws 170 and 172. The carrier plate 6 is in its forward position with its openings 8 alined with the drivers 4, and the drivers are at the end of their downward driving movement having just completed the insertion of slugs into the heel. The plunger 346 is pressed against the tread face of the heel by the spring 348, the pawl 352 by which the plunger 346 is elevated against the resistance of the spring 348 being spaced below the collar 350 of the plunger so as to permit it to follow the heel down as the heel plate 10 is lowered. The sweep arms 24, 26 and 30, 32 are above the conveyor 14, and the wire feeding disk 214 is up. The stop pin plate 242 is down far enough to position the upper ends of the stop pins 244 below the horizontal plane of the lower surface of the shutter plate 238. The bar 162 is back from the heel plate 10, the openings of the shutter plate 238 are in register with the openings 8 of the carrier plate 6 to permit the slugs to be driven, and the pushers 116 and 118 are rocked up. In the continued operation of the machine, the pusher rod 120 is moved endwise toward the right, as seen in Fig. 3, thus bringing its end into engagement with the upstanding projection 202 on the locking member 200. The centering jaws 170 and 172 are thus opened and are locked in open position by the member 200 which is swung across the end of the bearing 124. The heel A is prevented from being moved off the heel plate 10 by the pusher 116 during such movement of the pusher rod 120 by reason of being clamped between the heel plate 10 and the carrier plate 6. Meanwhile, the conveyor 14 is moved from the position shown in Fig. 11 to that shown in Fig. 12 to carry a heel between the sweep arms 24 and 26. After the centering jaws 170 and 172 have been opened and locked in open position, as before described, the rod 120 is moved back to the left, as seen in Fig. 3, thus relieving the pressure of the pusher 116 on the breast edge of the heel. The wedge 90 is then moved out of locking relation to the post 62 of the heel plate 10, after which the heel plate begins to move downwardly, the drivers 4 simultaneously starting to move upwards. At the same time, the sweeps are moved to cause the pair 24, 26 to transfer a heel from the conveyor 14 to the table 12. The parts are then in the positions indicated in Fig. 13.

Figures 10, 14:
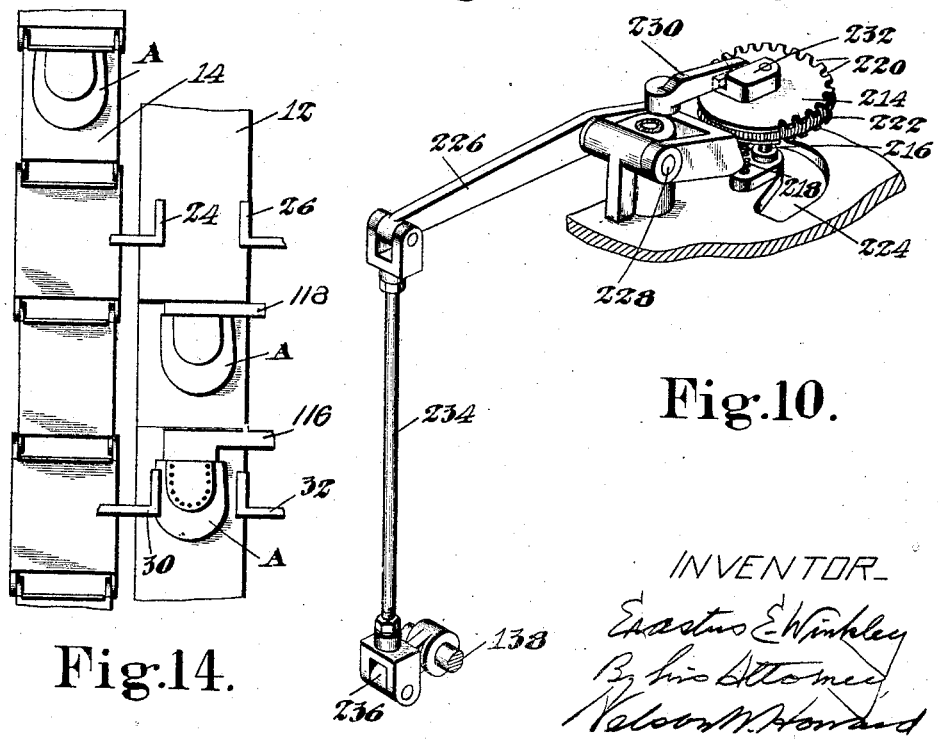
Fig. 10 is perspective view of the devices for feeding the fastening stock.

After the drivers 4 have been moved up far enough to free the carrier plate 6, it is moved toward the right to the position shown in Fig. 4 to line up its openings 8 with the openings 210 of the wire guiding plate 212. The plunger 346 moves downwardly with the heel plate 10 far enough to thrust the heel out of engagement with the carrier plate 6 and the gripper jaws 170 and 172, but is prevented from further following the heel in its downward movement by the engagement of the collar 350 on the plunger with the latch 352. The latch 352 is then raised carrying the plunger 346 with it, and simultaneously the stop pins 244 are projected into the openings 8 of the carrier plate to measure the slugs. As the bracket 246 raises the stop pin plate 242, it allows the bar 162 to be forced in by the spring 168. Consequently, as the heel plate 10 completes its downward movement, the bar 162 engages under the edge of the heel. The rod 120 is then reciprocated toward the right (see Fig. 2), causing the pusher 116 to move the finished heel off the heel plate 10 and the pusher 118 to push the heel resting on the table 12 between the sweep arms 24 and 26 on to the plate 10, as indicated in Fig. 14. As the fresh heel is moved on to the heel plate 10, it is engaged by the end of the bar 162 and pressed yieldingly against the pusher 118. After the fresh heel has been fully transferred to the heel plate by the pusher 118, the latch 352 in the upward movement of the arm 354 is disengaged from the collar 350 on the plunger 346 by the pin 362, thus permitting the plunger 346 to descend on the heel. Meanwhile, the disk 214 has been moved down to thrust the ends of the wires into the openings 8 of the carrier plate 6, and the carrier plate has been moved a little toward driving position to grip the wires between it and the wire guiding plate 212. The spring 250 allows the stop pin plate 242 to partake of this movement of the carrier plate 6, wherefore the wires are prevented from moving relatively to the carrier plate 6 after the slugs to be severed from them have been measured by the stop pins 244. While the wires are gripped between the carrier plate 6 and plate 212, the arm 230 of the wire feeding lever 226 is swung upwardly, thus permitting the disk 214 to be moved upwardly on the wires by the spring 218 so as to cause further feeding of the wires to be effected upon the next subsequent downward movement of the disk. After the wires have been gripped by the carrier plate 6 and the wire guiding plate 212, the stop pin plate 242 is lowered to clear the openings 8 of the carrier plate 6 and the openings of the shutter plate 238. As it moves downwardly, the stop pin plate engages the finger 336, thereby actuating the shutter plate 238 to close the openings 8 of the carrier plate.

The arm 354 is also lowered at the same time as the stop pin plate 242, thus depressing the latch 352 and causing it again to engage under the collar 350 on the plunger 346. When the stop pin plate 242 moves down to clear the shutter plate 238 and to shift the shutter plate across the openings of the carrier plate 6, it causes the bar 162 to be moved to the right, as seen in Fig. 4, thus clearing the back of the heel on the heel plate 10 and permitting it to be moved upwardly toward the carrier plate 6 without interference by the bar. Meanwhile, the sweeps 30, 32 have been operated to move the finished heel from the table 12 onto the conveyor 14. The heel plate 10 is then raised and the carrier plate 6 is actuated to sever the slugs from the wires and to convey them toward the drivers. In the meantime, the pushers 116 and 118 are rocked downwardly far enough to cause the pusher 116 to clear the heel on the heel plate. The pusher rod 120 is then moved to the left, whereby the pin 206 on the rod 120 is brought into engagement with the shoulder 208 on the locking member 200, thus permitting the centering jaws 170 and 172 to close on the heel. The pushers 116 and 118, after having been carried fully to the left, are swung upwardly to aline the flange 180 on the pusher 116 with the breast of the heel and are then moved somewhat to the right, as seen in Fig. 3, to press the heel firmly into engagement with the centering jaws 170 and 172. The movements of the heel plate 10, carrier plate 6, and rod 120 are so timed that the jaws will be closed on the heel and the openings of the carrier plate and the shutter plate alined with the drivers 4, when the tread face of the heel has been brought nearly but not quite to the level of the under surface of the shutter plate. The arrangement of the parts of the illustrated machine is such that the tread surface of the heel is not more than one sixteenth of an inch from the shutter plate at the time of the alinement of the openings of the shutter plate with those of the carrier plate, and it is contemplated that the shortest of the slugs will not be less than one-eighth of an inch in length. Consequently, there is no possibility of the escape of the slugs before they are driven. As the heel plate 10 moves up, the stop pin plate 242 also moves up far enough to free it from the finger 336 so that the finger, when engaged by the shutter plate 238 in the next subsequent movement of the carrier plate 6 to slug receiving position will swing freely and not disturb the alinement of the openings of the shutter plate with those of the carrier plate. At the same time, the latch 352 is raised to close a part of the distance opened up between the latch and the collar 350 on the plunger 346 as the plunger moves up with the heel. After the heel has been pressed firmly against the carrier plate 6, the wedge 90 is moved into position to lock the heel plate up, and the drivers 4 are forced down to drive the slugs, thus completing a full cycle of operations of the machine.

Having thus described my invention, what I claim as new and desire to secure by Letters Patent of the United States is:—

1. In a machine of the class described, the combination of means for operating on heels, a conveyor, a pair of contact members for removing a heel from the conveyor, mechanism for transferring the heel from the contact members to the operating means comprising a pusher, and a second pair of contact members for replacing the heel upon the conveyor.

2. In a machine of the class described, the combination of means for operating on heels, a conveyor, mechanism for removing heels from the conveyor and replacing them on the conveyor, a heel plate for supporting a heel in the field of operation of the operating means, a pusher for transferring the heel from said mechanism to the heel plate, and a second pusher for transferring a heel from the heel plate to said mechanism in synchronism with the transfer of the heel from said mechanism to the heel plate.

3. A machine of the class described, the combination of means for operating on heels, a heel plate, means for raising the heel plate to lift a heel into the field of operation of the operating means, a conveyor, and means for transferring heels from the conveyor to the heel plate.

4. In a machine of the class described, the combination of means for operating on heels, a heel plate, means for raising the heel plate to lift a heel into the field of operation of the operating means, a conveyor movable relatively to the operating means while a heel is on the heel plate, and means for transferring heels from the conveyor to the heel plate and back to the conveyor comprising devices for moving heels on and off the heel plate in a direction substantially parallel to the direction of movement of the conveyor.

5. In a machine of the class described, the combination of means for operating on heels, means for supporting a heel in the field of operation of the operating means, a conveyor, means for transferring a heel from the conveyor to the supporting means, and separate means for transferring the heel from the supporting means back to the conveyor, each of said transferring means being arranged to engage each heel simultaneously upon opposite sides.

6. In a machine of the class described, the combination of means for operating on heels, a heel plate for moving a heel into the field of operation of the operating means, a conveyor, and means for transferring a heel from the conveyor to the heel plate and from the heel plate back to the conveyor comprising means for synchronously moving one heel off and another on the heel plate.

7. In a machine of the class described, the combination of means for operating on heels, means for transferring heels to the operating means comprising a plurality of members adapted to grip a heel between them, connections between the members for causing them normally to move together but constructed to permit relative movement of the members, means for limiting the movement of one of the members, and operating means for the transferring means operable on another of the members and having a range of movement greater than the common movement of the members, thereby to separate the members to facilitate the introduction of a heel between them.

8. In a machine of the class described, the combination of means for operating on heels, means for transferring heels to the operating means comprising a plurality of members adapted to grip a heel between them, means for mounting the members for to and fro movement, connections between the members for causing them normally to move together but constructed to permit relative movement of the members, means for limiting the common movement of the members in both directions, and operating means for the members movable in both directions beyond the range of the common movement of the members to separate the transferring members at each end of their movement.

9. In a machine of the class described, the combination of means for operating on heels, means for transferring heels to the operating means comprising members adapted to receive a heel between them and having spaced portions, yielding means for causing the members normally to move together but permitting relative movement of the members, means for limiting the movement of a member in each direction, and operating means for the members disposed for engagement alternately with said spaced portions and movable through a greater range of movement than the common movement of the members, thereby to separate said members.

10. In a machine of the class described, the combination of means for operating on heels, means for transferring heels to and from the operating means comprising a plurality of pairs of sweeps disposed oppositely with relation to the operating means, corresponding members of the pairs of sweeps being mounted for movement as a unit, a spring for normally connecting the members of the pairs of sweeps for common movement, means for limiting the common movement of the members, and operating means for the members movable beyond the limit of their common movement to separate the members of the pairs of sweeps, thereby to facilitate the introduction of heels between them.

11. In a machine of the class described, the combination of means for operating on heels, means for transferring heels to and from the operating means comprising a plurality of pairs of sweeps disposed oppositely with relation to the operating means, corresponding members of the pairs of sweeps being mounted for movement as a unit, a spring for normally connecting the members of the pairs of sweeps for common movement, means for limiting the common movement of the members, operating means for the members movable beyond the limit of their common movement to separate the members of the pairs of sweeps, thereby to facilitate the introduction of heels between them, and means for moving a heel from one pair of sweeps to the first-mentioned operating means and from said operating means to the other pair of sweeps.

12. In a machine of the class described, means for inserting fastenings in heels, mechanism for conveying heels toward and away from the fastening inserting means, means for automatically transferring a heel from the conveying mechanism to the fastening inserting means and means for transferring the heel from the fastening inserting means to the conveying mechanism.

13. In a machine of the class described, the combination of means for slugging heels, and means for presenting heels to the slugging means comprising a conveyor and means for automatically transferring heels from the conveyor to the slugging means and back to the conveyor.

14. In a machine of the class described, the combination of means for severing slugs from wire, means for inserting the severed slugs in heels and a substantially horizontally moving conveyor arranged to deliver the heels to and to carry them from the slug inserting means.

15. A slugging machine adapted to constitute one of a series of automatic machines for operating on heels, comprising means for slugging heels, means for automatically presenting heels to the slugging means, and feeding means for automatically carrying the heels from the slugging machine in an orderly series to facilitate their delivery to another machine of the system.

16. In a machine of the class described, the combination of means for slugging heels, and means for automatically presenting heels to the slugging means comprising a conveyor, a heel plate for lifting the heels to the slugging means and means for transferring heels from the conveyor to the heel plate.

17. In a machine of the class described, the combination of means for operating on heels, a pair of centering jaws for locating a heel relatively to the operating means, a conveyor and means for automatically transferring heels from the conveyor to the centering jaws and from the centering jaws back to the conveyor.

18. In a machine of the class described, the combination of means for operating on heels, a pair of centering jaws for locating a heel relatively to the operating means, means for lifting a heel to the centering jaws, and means for automatically supplying heels successively to the lifting means.

19. In a machine of the class described, the combination of means for operating on heels, a pair of centering jaws for locating a heel relatively to the operating means, means for lifting the heel to the operating means, means for pressing the jaws against the heel, and supporting means for the jaws constructed to permit them to move upwardly with the heel.

20. In a machine of the class described, the combination of a frame, a slide detachably mounted on the frame, fastening inserting means carried by the slide, a pair of centering jaws mounted on the frame for locating the work with relation to the fastening inserting means, and means on the slide for controlling the centering action of the jaws.

21. In a machine of the class described, the combination of means for operating on a heel, a pair of centering jaws for locating the heel with relation to the operating means means for pivotally supporting said jaws for movement relatively to the operating means and to each other, a stop interposed between the jaws to determine the position of one of the jaws, yielding means for moving the other of said jaws toward the first-named jaw, and means for separating said jaws to facilitate the introduction of a heel between them.

22. In a machine of the class described, the combination of means for operating on heels, a pair of relatively movable jaws for centering a heel with respect to the operating means, and means operable on the breast of the heel to move it into engagement with the centering means.

23. In a machine of the class described, the combination of means for severing slugs from wire, means for inserting the severed slugs in heels, means for centering a heel relatively to the slug inserting means, and means for presenting a heel to the centering means comprising a member operable yieldingly on the breast of the heel during the insertion of the slugs.

24. In a machine of the class described, the combination of means for operating on heels, means for centering a heel relatively to the operating means, means for presenting the heel to the centering means, and means operated by the presenting means for moving the centering means out of operative relation to the heel.

25. In a machine of the class described, the combination of means for operating on heels, means for centering a heel relatively to the operating means by engagement with the contour of the heel, a member operable on the breast of the heel to move it into engagement with the centering means, means for moving said member yieldingly against the heel, means operated by said moving means for rendering the centering means inoperative on the heel, and means for retaining the heel against movement by said member relatively to the operating means after the centering means has been rendered inoperative.

26. In a machine of the class described, the combination of means for operating on heels, a heel plate, means for operating the heel plate to lift a heel to the operating means, and spaced pushers for synchronously moving one heel off and another on the heel plate.

27. In a machine of the class described, the combination of means for operating on heels, a heel plate, means for moving the heel plate to present a heel to the operating means, means for transferring heels to and from the heel plate comprising a pusher, a rod upon which the pusher is loosely mounted, means for imparting endwise and angular movements to the rod, yielding means for moving the pusher upon endwise movement of the rod, and means for connecting the pusher to the rod constructed to cause the pusher to partake of the angular movements of the rod.

28. In a machine of the class described, the combination of means for operating on heels, a heel plate, means for moving the heel plate to present a heel to the operating means, means for transferring heels to and from the heel plate comprising spaced pushers, a rod upon which the pushers are loosely mounted, means for imparting endwise and angular movements to the rod, yielding means for moving one of the pushers upon endwise movement of the rod, means for connecting the pushers to the rod constructed to cause them to partake of the angular movements of the rod, and means for adjusting the pushers longitudinally on the rod.

29. In a machine of the class described, the combination of means for inserting fastenings in heels, a pair of centering jaws arranged to grip a heel with its top-lift up for locating the heel relatively to the fastening inserting means, means tending normally to close the centering jaws, means for opening the jaws, means for locking the jaws open, means for presenting a heel to the jaws, and means operable in timed relation to the presenting means for unlocking the jaws subsequent to the presentation of a heel thereto to permit them to engage the heel.

30. In a machine of the class described, the combination of means for operating on heels, a pair of centering jaws for locating a heel relatively to the operating means, means for presenting a heel to the centering jaws, means tending normally to close the centering jaws, means for locking the jaws open, and means operated by the presenting means for releasing the locking means to permit the jaws to be closed on the heel.

31. In a machine of the class described, the combination of means for operating on heels, a pair of centering jaws for locating a heel relatively to the operating means, a rod, a pusher on the rod for moving a heel into engagement with the centering jaws, and means operated by the rod for opening the centering jaws.

32. In a machine of the class described, the combination of means for operating on heels, a pair of centering jaws for locating a heel relatively to the operating means, means for presenting a heel to the centering jaws comprising a pusher, means for operating the pusher into and out of position to engage a heel in the centering jaws, means for locking the jaws open, and means operatively connected to the pusher operating means for releasing the locking means, said releasing means and said locking means being constructed and arranged to render the releasing means inoperative on the locking means when the pusher is in position to engage a heel in the centering jaws.

33. In a machine of the class described, means for operating on heels, a pair of centering jaws arranged for limited movement in a direction perpendicular to the plane of their centering movement for locating a heel with relation to the operating means, and means for opening the centering jaws and locking them in open position.

34. In a machine of the class described, the combination of means for operating on heels, means for centering a heel relatively to the operating means, an abutment, an actuating member mounted adjacent to the abutment and operatively connected to the centering means, yielding means tending normally to press the centering means against the heel and to move the actuating member toward the abutment, a locking member pivotally carried by the actuating member, and mechanism operable on the locking member to move the centering means away from the heel and to turn the locking member into engagement with the abutment to maintain the centering means in the position to which it is moved.

35. In a machine of the class described, the combination of means for operating on heels, a pair of centering jaws for locating a heel relatively to the operating means, a rod, an abutment adjacent to the rod, an actuating member mounted adjacent to the abutment and operatively connected to the centering jaws, yielding means tending normally to close the jaws and to move the actuating member toward the abutment, a locking member carried by the actuating member having a part collinear with the rod for engagement with the rod upon endwise movement of the rod, means for moving the rod endwise to open the jaws, means for turning the locking member into engagement with the abutment to lock the jaws in open position, and means carried by the rod for releasing the locking means on reverse movement of the rod.

36. In a machine of the class described, the combination of means for operating on heels, a pair of centering jaws for locating a heel relatively to the operating means, a rod, means for moving the rod endwise, an abutment having surfaces disposed in the general direction of the rod and transversely of the rod respectively, yielding means tending normally to close the jaws, means for opening the jaws comprising a locking member movable along the first-mentioned surface of the abutment and having a part collinear with the rod for engagement by the rod upon endwise movement of the rod to effect movement of the locking member relatively to the abutment, and means for moving the locking member into locking engagement with the transverse surface of the abutment.

37. In a machine of the class described, the combination of means for operating on heels, a pair of centering jaws for locating a heel relatively to the operating means, a rod, means for moving the rod endwise, an abutment having surfaces disposed in the general direction of the rod and transversely of the rod respectively, yielding means tending normally to close the jaws, means for opening the jaws comprising a locking member movable along the first-mentioned surface of the abutment and constructed and arranged for locking engagement with the transverse surface of the abutment upon endwise movement of the rod in one direction, and means carried by the rod for releasing the locking member, said means being normally inoperative on the locking member and rendered operative on said member by angular movement of the rod.

38. In a machine of the class described, the combination of means for operating on heels, a pair of centering jaws for locating a heel relatively to the operating means, a rod, means for moving the rod endwise, an abutment having surfaces disposed in the general direction of the rod and transversely of the rod respectively, means tending normally to close the centering jaws, means for opening the jaws comprising a locking member having a shouldered portion adjacent to the rod, said locking member being movable along the first-mentioned surface of the abutment and having a part collinear with the rod for engagement by the rod upon endwise movement to effect movement of the locking member relatively to the abutment, means for moving the locking member into engagement with the transverse surface of the abutment, and a pin on the rod disposed to be brought into engagement with the shoulder on the locking member in one position of the rod to release the locking member from the abutment.

39. In a machine of the class described, the combination of a frame, a slide detachably mounted on the frame, and mechanism carried by the slide for measuring fastenings and severing them from fastening stock.

40. In a machine of the class described, the combination of a frame, a holder detachably mounted on the frame, mechanism carried by the holder for measuring fastenings and severing them from fastening stock, and means on the frame for operating the measuring and severing mechanism.

41. In a machine of the class described, the combination of a frame, a holder detachably mounted on the frame, means carried by the holder, for severing a plurality of fastenings from wire simultaneously, and means also carried by the holder for variably determining the lengths of the fastenings.

42. In a machine of the class described, the combination of a frame, a slide detachably mounted on the frame, means carried by the slide for severing a plurality of fastenings from fastening stock simultaneously, a stop pin plate for variably determining the lengths of the fastenings, and means carried by the frame for operating the severing means and the stop pin plate.

43. In a machine of the class described, the combination of a frame, a holder detachably mounted on the frame, means carried by the holder for inserting a plurality of fastenings simultaneously, and means also carried by the holder for presenting fastenings to the inserting means.

44. In a machine of the class described, the combination of a frame, a holder detachably mounted on the frame, a plurality of drivers carried by the holder for inserting a plurality of fastenings simultaneously, and a carrier plate also carried by the holder for presenting fastenings to the drivers.

45. In a machine of the class described, the combination of a frame, a slide detachably mounted on the frame, drivers carried by the slide, a head reciprocable on the frame, and a plurality of pawls for automatically securing the drivers to the head.

46. In a machine of the class described, the combination of a frame, a slide detachably mounted on the frame, drivers carried by the slide, fastening supplying means carried by the slide, a head reciprocable on the frame, means for securing the drivers to the head, and means for centering the drivers relatively to the head.

47. In a machine of the class described, the combination of a frame, a holder detachably mounted on the frame, a plate carried by the holder, a plurality of drivers movable in openings in the plate, means for severing fastenings from wire and presenting them beneath the drivers, and means on the frame for operating the drivers and the severing means.

48. In a machine of the class described, the combination of a gang of drivers arranged for driving a row of fastenings simultaneously and means for forming fastenings of different lengths from wire having a cross-section the same as that of the fastenings and presenting them to the drivers.

49. In a machine of the class described, fastening inserting means comprising a plurality of drivers disposed correspondingly to the contour of a heel, and means for forming fastenings of different lengths from wire and presenting them to the drivers, said forming and presenting means comprising means constructed and arranged to enable the arrangement and numerical proportion of relatively long and short fastenings to be varied.

50. In a machine of the class described, the combination of means for driving a plurality of fastenings simultaneously, and means for presenting fastenings to the driving means comprising a carrier plate, means for feeding wire into the openings of the plate and means co-operating with the plate to measure the fastenings severed from the wire and comprising members constructed and arranged for projection into the openings of the plate oppositely from the wires.

51. In a machine of the class described, the combination of fastening inserting means, and means for presenting a fastening to the fastening inserting means comprising a member having an opening to receive a piece of fastening stock and means for measuring the fastening severed from the stock comprising a member disposed for projection into said opening opposite the fastening stock.

52. In a machine of the class described, means for inserting fastenings, means for severing fastenings from fastening stock, means for feeding the fastening stock, and a pattern plate interposed in the path of movement of the fastening stock for measuring the lengths of the fastenings.

53. In a machine of the class described, means for inserting a plurality of fastenings simultaneously, and means for forming fastenings of different lengths for presentation to the inserting means and comprising a pattern member adapted to be changed to vary the arrangement of relatively long and short fastenings.

54. In a machine of the class described, the combination of means for driving a plurality of fastenings simultaneously, and means for presenting fastenings to the driving means comprising wire guiding means having a plurality of wire receiving openings, a carrier plate having openings adapted to register with the openings of the wire guiding means and a member carrying measuring pins for projection into the openings of the plate when said openings are in register with the openings of the wire guiding means.

55. In a machine of the class described, the combination of means for driving a plurality of fastenings simultaneously, and means for presenting fastenings to the driving means comprising wire guiding means having a plurality of wire receiving openings, a carrier plate having openings to receive the ends of the wires in the guiding means, means for operating the plate relatively to the wire guiding means to grip the wires and feeding means for the wires movable relatively thereto while the wires are gripped between the plate and the wire guiding means.

56. In a machine of the class described, the combination of means for driving a plurality of fastenings simultaneously, and means for presenting fastenings to the driving means comprising a carrier plate having a plurality of openings to receive fastening stock, a shutter plate having openings adapted for alinement with the openings of the carrier plate, means for feeding stock into the openings of the carrier plate, controlling means for the shutter plate constructed to aline the openings of the shutter plate with those of the carrier plate when the stock is fed to the carrier plate, means for moving the shutter plate to close the openings of the carrier plate and means for subsequently moving the carrier plate to sever fastenings from the fastening stock and to convey the fastenings to the driving means.

57. In a machine of the class described, the combination of means for driving a plurality of fastenings simultaneously, and means for presenting the fastenings to the driving means comprising a carrier plate having a plurality of openings to receive fastening stock, a shutter plate having openings adapted for alinement with the openings of the carrier plate, means for feeding fastening stock into the openings of the carrier plate, means for measuring the fastenings severed from the fastening stock comprising members adapted for projection through the openings of the shutter plate into the openings of the carrier plate, means for moving said members out of said openings, means operated by the measuring means for closing the shutter plate to prevent the escape of fastenings from the openings of the carrier plate and means for moving the carrier plate to sever the fastenings from the stock subsequent to the closing of the shutter plate.

58. In a machine of the class described, the combination of means for driving a plurality of fastenings simultaneously, and means for presenting fastenings to the driving means comprising a carrier plate having a plurality of openings to receive fastening stock, a shutter plate having openings adapted for alinement with the openings of the carrier plate, devices for feeding fastening stock into the openings of the carrier plate, means for measuring the fastenings severed from the fastening stock comprising pins for projection into the openings of the carrier plate, means for moving the pins out of the openings of the carrier plate, means operated by the measuring means for closing the shutter plate and operating means for the carrier plate and the devices for feeding the fastening stock operable to cause the carrier plate to grip the fastening stock during movement of the feeding devices away from the carrier plate and to sever the stock subsequently to the closing of the shutter plate and the movement of the feeding devices.

59. In a machine of the class described, the combination of fastening inserting means, and means for presenting fastenings to the fastening inserting means comprising means for guiding fastening stock, a fastening receiving member having an opening to receive the stock from the guiding means, means for moving the fastening receiving member to grip the stock between itself and the guiding means and means constructed and arranged for projection into the opening of the fastening receiving member opposite the fastening stock to measure the fastening severed from the stock, said means being mounted to partake of the gripping movement of the fastening receiving member so as to retain control over the fastening stock until it is gripped.

60. In a machine of the class described, the combination of means for inserting a plurality of fastenings simultaneously, and means for presenting fastenings to the fastening inserting means comprising wire guiding means, a carrier plate having openings to receive the ends of the wires, means for operating the carrier plate to grip the wires between itself and the guiding means, a member carrying pins for projection into the openings of the carrier plate opposite the wires and supporting and operating means for said member constructed to cause said pins to partake of the gripping movement of the carrier plate to enable them to retain control of the wires until they are gripped.

61. In a machine of the class described, the combination of means for driving a plurality of fastenings simultaneously, and means for presenting fastenings to the driving means comprising a carrier plate having a plurality of openings, a shutter plate, means co-operating with the carrier plate to measure the fastenings and means operated by the measuring means for moving the shutter plate to close the openings of the carrier plate.

62. In a machine of the class described, the combination of means for operating on heels, a heel plate, means for lifting the heel plate to present a heel to the operating means, and means operable on the surface of the heel opposite from the heel plate for clamping the heel on the heel plate as it is being lifted.

63. In a machine of the class described, the combination of means for slugging heels comprising a plurality of drivers disposed to correspond substantially to the contour of a heel, a heel plate, means for lifting the heel plate to present a heel to the slugging means, and means movable within the space defined by the drivers for clamping the heel on the heel plate as it is being lifted.

64. In a machine of the class described, the combination of means for slugging heels comprising a plurality of drivers disposed to correspond substantially to the contour of a heel, a heel plate, means for operating the heel plate to present a heel to the slugging means and to move it away from the slugging means after it has been slugged, and a spring pressed plunger movable in the space defined by the drivers and operating to clamp the heel on the heel plate during movement toward and from the slugging means.

65. In a machine of the class described, the combination of means for slugging heels comprising a plurality of drivers disposed to correspond substantially to the contour of a heel, a heel plate, means for operating the heel plate to present a heel to the slugging means and to move it away from the slugging means after it has been slugged, a spring pressed plunger movable in the space defined by the drivers and operating to clamp the heel on the heel plate during movement toward and from the slugging means, means for limiting the movement of the plunger to cause the heel to be moved away from the plunger on the retrograde movement of the heel plate to facilitate the removal of the finished heel from the heel plate and the presentation of another heel thereto, and controlling means for the limiting means constructed to permit the plunger to be pressed into engagement with the heel.

66. In a machine of the class described, the combination of means for operating on heels, and a heel plate, a gage for locating the heel on the heel plate, means for pressing the heel against the gage by engagement with the heel, means for operating the heel plate to move the heel into operative relation to the operating means, and means for moving the pressing means away from the heel to prevent interference by such means with the movement of the heel to the operating means.

67. In a machine of the class described, the combination of means for operating on heels, a heel plate, a gage disposed for engagement with the breast of the heel to locate the heel in proper position on the heel plate, means for operating the heel plate to raise the heel toward the operating means and to lower it therefrom, a member operable to press the heel against the gage, means operable in timed relation to the heel plate operating means for moving said member away from the heel to prevent interference by the member with the heel while it is being moved to the operating means and for effecting reverse movement of the member prior to the downward movement of the heel plate to cause the member to engage the heel upon its downward movement, and means for removing the finished heel from the heel plate and placing a fresh heel on the heel plate.

68. In a machine of the class described, the combination of means for operating on heels, a heel plate, a gage disposed for engagement with the breast of the heel to locate the heel in proper position on the heel plate, means for operating the heel plate to move the heel toward the operating means, a member operable on the heel to press the heel against the gage, means operable in timed relation to the heel plate operating means for moving said member away from the heel to prevent interference by the member with the heel while it is being moved to the operating means, means for clamping the heel against the heel plate while it is being moved to the operating means, and controlling means for the clamping means operable to cause the clamping means to engage the heel while it is held between the gage and the pressing member.

69. In a machine of the class described, the combination of means for inserting fastenings, means for presenting fastenings to the fastening inserting means comprising means for measuring the length of a fastening, means for presenting work to the fastening inserting means comprising a lifting plate, a gage disposed for contact with the edge of the work to locate it with relation to the plate and means for pressing the work against the gage, and means operatively connected with the measuring means for moving the pressing means away from the work.

70. In a machine of the class described, the combination of a reciprocating member, and mechanism for reciprocating the member comprising rigid means for moving the member positively during the main portion of the movement of the member in both directions and means for moving the member through the final portion of its movement in each direction constructed to yield upon obstruction to the movement of the member.

71. In a machine of the class described, the combination of a reciprocating member, means for limiting the movement of the member in both directions, and mechanism for reciprocating the member comprising rigid means for moving the member positively during the main portion of the movement of the member in both directions and means for moving the member through the final portion of its movement in either direction constructed to yield upon obstruction to the movement of the member by the limiting means.

72. In a machine of the class described, the combination of a reciprocating member, and means for reciprocating the member including a cam having rigid portions operating positively to move the member during the main portion of the movement of the member in both directions, said cam having portions arranged for operative connection to the member during the final portions of the movement of the member in both directions and arranged to yield upon suspension of the movement of the member.

73. In a machine of the class described, the combination of means for inserting fastenings, and means for presenting fastenings to the inserting means comprising a reciprocating carrier plate, means for limiting the movement of the carrier plate in both directions and mechanism for operating the carrier plate constructed to move the carrier plate positively during the main portion of its movement in both directions and to yield upon the completion of the movement of the carrier plate in either direction.

74. In a machine of the class described, the combination of means for inserting fastenings, and means for presenting fastenings to the inserting means comprising a reciprocating carrier plate, stops for limiting the movement of the carrier plate in both directions and mechanism for reciprocating the carrier plate comprising a cam having rigid portions operable to move the carrier plate positively during the main portion of its movement in both directions and having yieldingly mounted portions arranged for operative connection with the carrier plate during the final portion of its movement in each direction to permit such movement to be suspended upon engagement of the carrier plate with either of said stops.

75. In a machine of the class described, the combination of a plurality of drivers, means for guiding fastening stock, a reciprocating carrier plate provided with openings adapted for alinement with the stock in the guiding means and with the drivers, means for reciprocating the carrier plate between the drivers and the stock guiding means to sever fastenings from the fastening stock and to present them to the drivers, stops for limiting the movement of the carrier plate to insure accurate alinement of the openings of the carrier plate at each end of its movement with the fastening guide and the drivers respectively, and means for reciprocating the carrier plate constructed and arranged to move the carrier plate positively during the main portion of the movement of the carrier plate in each direction and to yield upon engagement of the carrier plate with one of said stops at the end of its movement in either direction.

76. In a machine of the class described, the combination of fastening inserting means, and means for presenting a fastening to the fastening inserting means comprising a member provided with an opening to receive fastening stock, means for feeding the fastening stock to said member comprising a disk having a transverse slot in its periphery, means for maintaining the stock frictionally in the slot of the disk and means for reciprocating the disk to feed the stock to said member.

77. In a machine of the class described, the combination of fastening inserting means, and means for presenting fastenings to the fastening inserting means comprising a member provided with openings to receive fastening stock, means for feeding fastening stock into the openings of said member comprising a disk having a plurality of transverse slots in its periphery, a coiled spring for maintaining the fastening stock frictionally in the slots of the disk and means for reciprocating the disk to feed the fastening stock into the openings of said member.

78. In a machine of the class described, the combination of fastening inserting means, and means for presenting fastenings to the fastening inserting means comprising a plate provided with a plurality of openings to receive fastening stock, means for feeding fastening stock into the openings of the plate comprising a disk having its periphery grooved and provided with slots disposed transversely of its periphery, a coiled spring seated in the groove of the disk for maintaining the fastening stock frictionally in the slots of the disk, means for moving the plate to grip the fastening stock and operating means for said disk constructed to move it along the fastening stock while the stock is gripped by the plate.

79. In a machine of the class described, the combination of fastening inserting means, and means for presenting fastenings to the fastening inserting means comprising a plate having a plurality of wire receiving openings, means for feeding wires into the openings of the plate comprising a disk having a plurality of transverse slots formed in its periphery to receive the wires, means for maintaining the wires frictionally in the slots of the disk, a spring for operating the disk in one direction and means for operating the disk in another direction comprising a lever and a member fulcrumed on the lever for movement over and away from the top of the disk to facilitate the substitution of disks of varying sizes.

80. In a machine of the class described, the combination of means for inserting a plurality of fastenings simultaneously, a heel plate shaped to conform to the heel seat engaging surface of a heel, yielding means for raising the heel plate, and means constructed and arranged for engagement beneath a portion of said mechanism to lock the heel plate in raised position rigidly to support the heel while being operated upon by the fastening inserting means.

81. In a machine of the class described, the combination of fastening inserting means, means for presenting a heel to the fastening inserting means comprising a heel plate shaped to conform to the heel seat engaging surface of a heel, yielding means for raising the heel plate, a member having an inclined surface for engagement with a portion of the presenting means to lock the heel plate in raised position rigidly to support the heel during operation of the fastening inserting means thereon, yielding means for moving said member into engagement with the presenting means, and means for positively moving said member out of engagement with the presenting means to permit the heel plate to be subsequently lowered.

82. In a machine of the class described, the combination of means for inserting a plurality of fastenings simultaneously, means for presenting a heel to the fastening inserting means comprising a heel plate and yielding means for raising the heel plate, a wedge constructed and arranged for engagement beneath a portion of the presenting means to lock the heel plate in raised position rigidly to support the heel during operation thereon by the fastening inserting means, means for yieldingly moving the wedge in a direction to lock the heel plate, means for positively moving the wedge out of locking position to permit the heel plate to be lowered, and means for adjusting the wedge to accommodate it to heels of varying sizes.

83. In a slug inserting machine, the combination of a reciprocating slug carrier, and mechanism for reciprocating the carrier comprising rigid means for moving the carrier positively during the main portion of its movement in both directions and means for moving the carrier through the final portion of its movement in both directions constructed to yield upon obstruction to the movement of the carrier.

84. A fastening inserting machine having, in combination, means for severing a series of fastenings from wire having a cross section the same as that of the fastenings, means for simultaneously inserting the severed fastenings in a row, and means for controlling the lengths of the different fastenings severed and arranged to cause the lengths of the fastenings to be varied according to their position in the row.

85. A machine for inserting fastenings having, in combination, means for severing a series of fastenings from wire having a cross section the same as that of the fastenings, means for simultaneously inserting the severed fastenings in a row, and means for variably predetermining the lengths of the different fastenings severed.

86. In a machine for inserting fastenings, the combination with means for measuring fastenings of different lengths and severing them from fastening stock in accordance with the position which they are severally to occupy in a group, of means for transferring the fastenings from the position at which they are severed to fastening inserting position, and means for inserting the fastenings of the group simultaneously in the work.

87. In a fastening inserting machine, the combination of means for severing from wire fastenings of different lengths according to their several positions in a group, a plate provided with a series of perforations to receive the fastenings and arranged in accordance with the desired grouping of the fastenings, a gang of drivers and mechanism for moving the plate to bring the openings therein into registration with the drivers.

88. In a fastening inserting machine, the combination of means for simultaneously driving the fastenings of a group, and means for presenting fastenings to the driving means comprising a perforated plate, means for feeding fastenings into the openings of the plate and means for measuring the fastenings to vary their lengths according to the several positions which they are to occupy in the group.

89. In a fastening inserting machine, the combination of a gang of drivers, a perforated plate having a series of openings arranged to correspond with the gang of drivers, means for producing a group of fastenings of varying lengths from wire having a cross section the same as that of the fastenings and constructed to arrange the fastenings in the openings of the plate with their lengths in accordance with the several positions which they are to occupy in the completed work, means for bringing the openings in the plate into alinement with the drivers, and means for operating the drivers to insert the fastenings.

90. In a machine of the class described, the combination of a gang of drivers, means for presenting fastenings to the drivers comprising means for severing fastenings from wire of a cross section the same as that of the fastenings, with the different fastenings of a group of different predetermined lengths, and a carrier plate for moving the fastenings into alinement with the drivers, and means for operating the gang of drivers to insert the fastenings in the work.

91. In a machine of the class described, a gang of drivers arranged to insert a plurality of fastenings simultaneously, and means for presenting fastenings of different lengths to the gang of drivers including a changeable pattern member for determining the lengths of the different fastenings of a group.

92. In a machine of the class described, the combination of a gang of drivers arranged to insert simultaneously a plurality of fastenings, and mechanism for presenting a heel to the fastening inserting means comprising a heel plate shaped to conform to the heel seat engaging surface of a heel, yielding means for raising the heel plate to fastening inserting position and means constructed and arranged to lock the heel plate in raised position rigidly to support the heel during the insertion of a group of fastenings by the gang of drivers.

93. A machine for inserting fastenings having, in combination, means for simultaneously inserting the fastenings of a row, means for variably predetermining the lengths of the different fastenings, and conveyor mechanism arranged to carry the work successively toward and from the fastening inserting means.

94. In a fastening inserting machine, the combination of means for simultaneously driving the fastenings of a group, and means for severing fastenings from wire and presenting them to the driving means comprising a perforated plate, means for feeding fastenings into the openings of the plate and means for measuring the fastenings prior to their severing to vary their lengths according to the several positions which they are to occupy in the group.

95. In a machine for inserting fastenings in unattached heels, fastening inserting mechanism, a heel support movable from a heel receiving position into co-operation with the fastening inserting mechanism, means for delivering a heel to the support when in the receiving position, yieldable means for effecting such movement, and means for locking the heel support against yield under pressure of the fastening inserting mechanism.

96. In a machine for inserting fastenings in unattached heels, fastening inserting mechanism, a heel support movable from a heel receiving position into co-operation with the fastening inserting mechanism, a spring for effecting such movement, and an abutment member movable along the axis of the supported heel in co-operation with the support to lock said support against yield under the pressure of the fastening inserting mechanism.

97. In a machine for inserting fastenings in unattached heels, fastening inserting mechanism, a heel support movable from a heel receiving position into co-operation with the fastening inserting mechanism, a spring for effecting such movement, an abutment member movable along the axis of the supported heel in co-operation with the support to lock said support against yield under the pressure of the fastening inserting mechanism, and means for yieldably moving the abutment member.

98. In a machine for inserting fastenings in unattached heels, fastening inserting mechanism, a movable support arranged to carry a heel by contact with its heel seat surface, means for positioning the heel upon the support transversely of the heel seat surface, and means for moving the support into co-operation with the fastening inserting mechanism.

99. In a machine for inserting fastenings, fastening inserting mechanism, means for forming simultaneously a plurality of the fastenings to be inserted, and a pattern plate arranged to determine the length of the fastenings to be formed.

In testimony whereof I have signed my name to this specification.

ERASTUS E. WINKLEY.

Certificate of Correction.

Patent No. 1,620,149.  Granted March 8, 1927, to

ERASTUS E. WINKLEY.

It is hereby certified that error appears in the printed specification of the above-numbered patent requiring correction as follows: Page 10, line 57, claim 3, strike out the article "A" and insert instead the word and article *In a;* and that the said Letters Patent should be read with this correction therein that the same may conform to the record of the case in the Patent Office.

Signed and sealed this 6th day of September, A. D. 1927.

[SEAL.]
M. J. MOORE,
*Acting Commissioner of Patents.*